US012807900B2

(12) United States Patent
Soyez et al.

(10) Patent No.: US 12,807,900 B2
(45) **Date of Patent: *Nov. 24, 2026**

(54) PARTICLES COMPRISING POLYALKYLENE GLYCOL, AN EFFERVESCENT SYSTEM AND PERFUME

(71) Applicant: The Procter & Gamble Company, Cincinnati, OH (US)

(72) Inventors: Heidi Simonne Mariette Soyez, Puurs-Sint-Amands (BE); Geert Andre De Leersnyder, Wielsbeke (BE); Marina Jozefa Hermie, Hever (BE); Deepak Ahirwal, Brussels (BE); James Robert Tinlin, Brussels (BE); Cindy Jean, Houdeng-Aimeries (BE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,010

(22) Filed: Feb. 9, 2024

(65) Prior Publication Data

US 2024/0182815 A1 Jun. 6, 2024

Related U.S. Application Data

(63) Continuation of application No. 17/468,713, filed on Sep. 8, 2021, now Pat. No. 11,920,107.

(30) Foreign Application Priority Data

Sep. 14, 2020 (EP) .................................... 20195891

(51) Int. Cl.
*C11D 17/06* (2006.01)
*C11D 3/00* (2006.01)
(Continued)

(52) U.S. Cl.
CPC .......... *C11D 3/0094* (2013.01); *C11D 3/3707* (2013.01); *C11D 3/505* (2013.01); *C11D 17/06* (2013.01)

(58) Field of Classification Search
None
See application file for complete search history.

(56) References Cited

U.S. PATENT DOCUMENTS 5,780,418 A 7/1998 Niinaka
6,440,926 B1 8/2002 Spadoni et al.
(Continued)

FOREIGN PATENT DOCUMENTS

KR 102051755 B1 12/2019
WO 2010039575 A1 4/2010

OTHER PUBLICATIONS

AA01428F Extended EP Search Report for 20195891.5 dated Mar. 23, 2021, 5 pages.
(Continued)

*Primary Examiner* — Lorna M Douyon
(74) *Attorney, Agent, or Firm* — Carolyn S. Powell; Andrew J. Mueller; Gary J. Foose

(57) ABSTRACT

Disclosed are particles comprising polyalkylene glycol, an effervescent system and perfume for hard surface cleaning as well as a composition including these particles. Additionally, a method of making such particles and a method of using such particles for cleaning are also provided.

21 Claims, 3 Drawing Sheets

(51) Int. Cl.

| | |
|---|---|
| ***C11D 3/10*** | (2006.01) |
| ***C11D 3/22*** | (2006.01) |
| ***C11D 3/37*** | (2006.01) |
| ***C11D 3/50*** | (2006.01) |
| ***C11D 11/00*** | (2006.01) |
| ***C11D 11/02*** | (2006.01) |

(56) References Cited

U.S. PATENT DOCUMENTS

| | | | | |
|---|---|---|---|---|
| 9,347,022 | B1 | 5/2016 | Frentzel et al. | |
| 11,920,107 | B2 * | 3/2024 | Soyez | C11D 3/0052 |
| 2003/0013632 | A1 | 1/2003 | Santos et al. | |
| 2004/0147423 | A1 | 7/2004 | Scialla et al. | |
| 2007/0000067 | A1 | 1/2007 | Shi et al. | |
| 2013/0126634 | A1 * | 5/2013 | Blattner | B05B 11/1011 239/60 |
| 2014/0213500 | A1 | 7/2014 | Jabrane | |
| 2016/0368169 | A1 | 12/2016 | Huddleston et al. | |
| 2017/0283747 | A1 | 10/2017 | Aouad | |
| 2020/0181545 | A1 | 6/2020 | Neto et al. | |
| 2020/0224126 | A1 | 7/2020 | Burgess et al. | |
| 2020/0263114 | A1 | 8/2020 | Naqvi | |
| 2021/0189294 | A1 * | 6/2021 | Fossum | C11D 3/38636 |
| 2021/0198601 | A1 * | 7/2021 | Pelletier | C11D 3/0047 |
| 2022/0081652 | A1 | 3/2022 | Soyez et al. | |
| 2023/0235256 | A1 * | 7/2023 | Chen | C11D 1/652 510/349 |
| 2023/0250366 | A1 * | 8/2023 | Chen | C11D 3/0094 510/350 |

OTHER PUBLICATIONS

All Office Actions; U.S. Appl. No. 17/468,713, filed Sep. 8, 2021.
Extended European Search Report and Search Opinion; Application No 21195417.7; dated Feb. 11, 2022; 5 pages.

* cited by examiner

PARTICLES COMPRISING POLYALKYLENE GLYCOL, AN EFFERVESCENT SYSTEM AND PERFUME

FIELD OF THE INVENTION

The present invention relates to particles comprising polyalkylene glycol, an effervescent system and perfume, and compositions comprising the same.

BACKGROUND OF THE INVENTION

There are a variety of cleaning compositions for hard surfaces (for example glass, wood, metal, ceramic and the like) available in the market. Such cleaning compositions are mainly aqueous solutions comprising surfactants and other additives. For example, concentrated solutions of surfactants are commercially available as an all-purpose hard surface cleaner. When using such concentrated solutions, consumers usually dilute them with water in a bucket. Consumers immerse a cleaning tool such as a mop in the diluted cleaning solution within the bucket. Then, the mop can be used for cleaning hard surfaces. Alternatively, consumers can also spray product directly on the floor through a spray device with hard surface liquid.

Many consumers prefer freshness during the cleaning process and afterwards. Furthermore, a main limitation to meet such needs is the loading of perfume in limited amounts of surfactants in hard surface cleaner. In order to provide such freshness in a cost-effective manner, there is need to provide a perfume scent additive product that is independent of cleaning compositions for hard surfaces. A common technical approach is to load a particulate carrier with perfume. The perfume can be one or both of encapsulated perfume and unencapsulated perfume. Carriers including water soluble polymers and sugar can be used as the carrier material.

In the field of laundry, some particulate carriers loaded with perfume (so-called laundry beads) are known as perfume additives. Such laundry beads are added into washing machines together with detergent products in order to provide cleaned clothes with a freshness. However, such laundry beads do not work well in hard surface cleaning because of relatively slow dissolution at 20-40° C. It might take quite a long time (for example, at least 30 mins) for such beads to be dissolved in water, which is unacceptable for consumers. Therefore, there is a need to provide perfume particles having a high dissolution rate, which may be suitable for use in the hard surface cleaning context.

The present invention proposes to incorporate an effervescence system into perfume particles to provide a desirable dissolution rate in an aqueous solution (for example, a diluted hard surface cleaner) and also a freshness benefit as desired by consumers. Particularly, the present invention provides perfume particles comprising polyalkylene glycol, the effervescent system and perfume (hereinafter "Effervescent Perfume Particles").

Surprisingly, the Effervescent Perfume Particles may significantly improve cleaning performances of hard surface cleaners as compared to the same hard surface cleaners without such particles, which is totally unexpected, because none of polyalkylene glycol, the effervescent system and perfume in the Effervescent Perfume Particles is known as an active for hard surface cleaning. Even more surprisingly, when used at a certain range of concentrations, the Effervescent Perfume Particles alone (i.e., without the addition of APC) can provide an effective cleaning benefit.

SUMMARY OF THE INVENTION

The present disclosure provides a composition comprising a plurality of particles, wherein based on total weight of the particles, said particles comprise: from about 20% to about 70% of polyalkylene glycol (e.g., polyethylene glycol) having a weight average molecular weight from about 2000 to about 40000; from about 10% to about 70% of an effervescent system; and from about 0.1% to about 50% of perfume.

The present disclosure further provides a composition comprising Effervescent Perfume Particles as well as a method for making the composition according to the present disclosure. The present disclosure further provides a method of making a composition comprising Effervescent Perfume Particles, in which the method comprises the steps of: 1) providing a viscous material comprising: (a) from about 20% to about 70% of molten polyalkylene glycol having a weight average molecular weight from about 2000 to about 40000 by total weight of the viscous material, (b) from about 10% to about 70% of an effervescent system by total weight of the viscous material, and (c) from about 0.1% to about 50% of perfume by total weight of the viscous material; and 2) passing the viscous material through one or more apertures onto a surface upon which the viscous material is cooled to form a plurality of particles. Alternatively, the present disclosure further provides a method of making a composition comprising Effervescent Perfume Particles, in which the method comprises the steps of: 1) providing a viscous material comprising: (a) from about 20% to about 70% of molten polyalkylene glycol having a weight average molecular weight from about 2000 to about 40000 by total weight of the viscous material, (b) from about 10% to about 70% of an effervescent system by total weight of the viscous material, and (c) from about 0.1% to about 50% of perfume by total weight of the viscous material; 2) spreading the viscous material on a mould with cavities; 3) allowing the viscous material to cool so as to form a plurality of particles.

The present disclosure further provides another method of making a composition comprising Effervescent Perfume Particles, in which the method comprises the steps of: 1) providing a slurry comprising: (a) from 20% to 90%, from 30% to 80%, from 40% to 70%, from 45% to 60%, of molten polyalkylene glycol having a weight average molecular weight from 2000 to 40000 by total weight of the slurry, and (b) from 10% to 80%, from 20% to 70%, from 30% to 60%, from 40% to 55%, of perfume by total weight of the slurry; 2) atomizing the slurry through an atomizer into a chamber in which the atomized slurry is cooled to form a powder; 3) mixing the powder with an additional powder comprising an effervescent system to form a mixed powder in which the weight ratio of the powder to the additional powder is from 5:1 to 1:5, from 4:1 to 1:2, from 3:1 to 1:1; and 4) compressing the mixed powder into particles. The additional powder may comprise other ingredients including a surfactant, a binder, a co-carrier, a lubricant and the like.

The present disclosure further provides a method of making a composition comprising a plurality of particles that comprise polyalkylene glycol having a weight average molecular weight from 2000 to 40000 and perfume, wherein the method comprises the steps of: 1) providing a slurry comprising: (a) from 20% to 90%, 30% to 80%, from 40% to 70%, from 45% to 60%, of molten polyalkylene glycol by total weight of the slurry, and (b) from 10% to 80%, 20% to 70%, from 30% to 60%, from 40% to 55%, of the perfume by total weight of the slurry; 2) atomizing the slurry through an atomizer into a chamber maintained at a temperature below the melting point of the polyalkylene glycol resulting in the formation of microparticles containing the polyalkylene glycol and the perfume; 3) mixing the microparticles with a powder comprising a binder to form a mixed powder in which the weight ratio of the microparticles to the powder is from 5:1 to 1:5, from 4:1 to 1:2, from 3:1 to 1:1; and 4) compressing the mixed powder into particles. The powder may further comprise an effervescent system and optionally one or more ingredients selected from the group consisting of a surfactant, a co-carrier, and a lubricant.

The present disclosure further provides a method of cleaning hard surfaces, in which the method comprises the steps of: 1) providing a composition comprising a surfactant and Effervescent Perfume Particles comprising from about 20% to about 70% of polyalkylene glycol having a weight average molecular weight from about 2000 to about 40000 by total weight of the particles, from about 10% to about 70% of an effervescent system by total weight of the particles, and from about 0.1% to about 50% of perfume by total weight of the particles; 2) adding the composition and the Effervescent Perfume Particles into water to provide a cleaning solution; and 3) cleaning the hard surface by using the working solution. Particularly, the Effervescent Perfume Particles are added in a dosage of from about 0.001 g/L to about 100 g/L, from about 0.1 g/L to about 1.5 g/L, from about 0.2 g/L to about 1.3 g/L, from about 0.3 g/L to about 1.2 g/L, alternatively from about 0.01 g/L to about 0.5 g/L, alternatively from about 0.5 g/L to about 5 g/L, alternatively from about 1 g/L to about 10 g/L, for example 0.01 g/L, 0.05 g/L, 0.1 g/L, 0.2 g/L, 0.3 g/L, 0.5 g/L, 1 g/L, 2 g/L, 5 g/L, 10 g/L, 15 g/L, 20 g/L or any ranges therebetween.

DETAILED DESCRIPTION OF THE INVENTION

Figure 1:
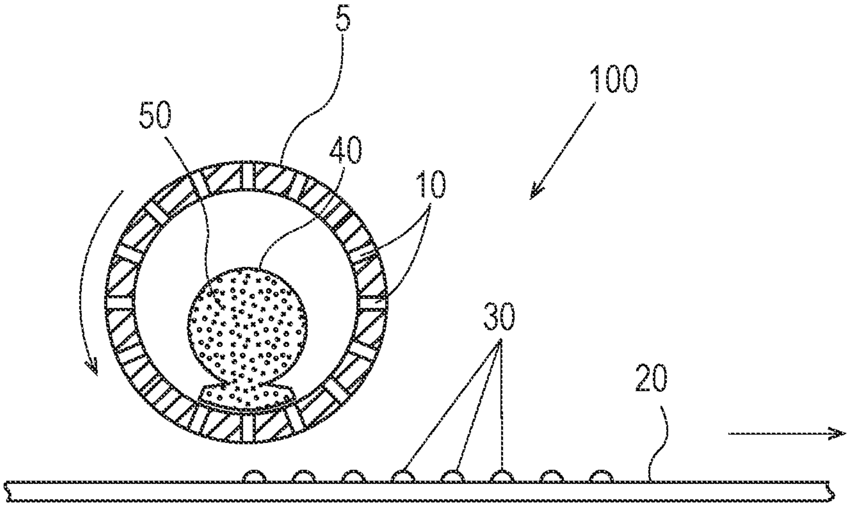
FIG. 1 is a schematic view of a pastillation apparatus used for making Effervescent Perfume Particles, according to one embodiment of the present invention.

The present disclosure provides Effervescent Perfume Particles comprising from about 20% to about 70% of polyalkylene glycol (e.g., polyethylene glycol) having a weight average molecular weight from about 2000 to about 40000 by total weight of the particles, from about 10% to about 70% of an effervescent system by total weight of the particles, and from about 0.1% to about 50% of perfume by total weight of the particles. It is an advantage of the composition according to the present disclosure that the dissolution rate of the Effervescent Perfume Particles may be significantly higher compared to particles without the effervescent system (hereinafter "Non-Effervescent Perfume Particles").

Unexpectedly, the compositions containing the Effervescent Perfume Particles may provide a significantly improved Cleaning Index as well as a significantly improved shine performance when cleaning hard surfaces, in comparison with similar compositions but do not contain such Effervescent Perfume Particles. Particularly, when the Effervescent Perfume Particles are used together with a hard surface cleaner, Cleaning Index may be significantly increased, for example by at least about 30%, at least about 50%, or even at least about 100%, in comparison with similar compositions but do not contain such Effervescent Perfume Particles. In view that Effervescent Perfume Particles alone do not exhibit a significant cleaning effect, the improved Cleaning Index achieved by the surface cleaning compositions containing Effervescent Perfume Particles is far beyond the expectation by the skilled person. Furthermore, when the Effervescent Perfume Particles are used at certain levels together with a hard surface cleaner, Shine Grade may be significantly improved by at least about 10%, at least about 20%, or even at least about 40%, in comparison with similar compositions but do not contain such Effervescent Perfume Particles.

It is another advantage of the composition according to the present disclosure that the Effervescent Perfume Particles may bring about a blooming effect. Particularly, the scent released by the Effervescent Perfume Particles reaches a high level at the very beginning (for example, without any significant lag).

It is another advantage of the composition according to the present disclosure that the Effervescent Perfume Particles may be stable.

The Effervescent Perfume Particles may comprise from about 25% to about 70%, from about 30% to about 65%, from about 35% to about 60%, from about 40% to about 50% or from about 50% to about 60%, of polyalkylene glycol by total weight of the particles.

The Effervescent Perfume Particles may comprise from about 15% to about 65%, from about 20% to about 60%, from about 25% to about 55%, from about 25% to about 35% or from about 35% to about 50%, of the effervescent system by total weight of the particles.

The Effervescent Perfume Particles may comprise from about 3% to about 40%%, from about 7% to about 35%, about from about 10% to about 30%, about from about 15% to about 25%, of the perfume by total weight of the particles.

The Effervescent Perfume Particles may further comprise other additives, for example, a surfactant, a co-carrier, a binder, a lubricant, a chelant, a dye and the like.

Polyethylene Glycol (PEG)

Polyethylene glycol (PEG) has a relatively low cost, may be formed into many different shapes and sizes, minimizes unencapsulated perfume diffusion, and dissolves well in water. PEG comes in various weight average molecular weights. A suitable weight average molecular weight range of PEG for the purposes of freshening laundry, hard surfaces or home includes from 2,000 to about 40,000, from 3000 to 30000, 3500 to 25000, 4000 to 20000, for example from about 4,000 to about 15,000, from about 5,000 to about 13,000, from about 6,000 to about 12,000, from about 7,000 to about 11,000, or any combinations thereof. PEG is available from BASF, for example PLURIOL E 8000.

The Effervescent Perfume Particles can comprise about 40% or more of PEG by total weight of the particles. The Effervescent Perfume Particles may comprise from 20% to 70%, from 20% to 60%, from 25% to 50%, from 25% to 45%, of polyalkylene glycol by total weight of said particles. The Effervescent Perfume Particles may comprise from 25% to 65%, from 30% to 55%, from 35% to 50%, from 38% to 46%, alternatively from about 40% to about 80%, alternatively from about 45% to about 75%, alternatively from about 50% to about 70%, or any whole percentages or ranges of whole percentages within any of the aforementioned ranges, of PEG by total weight of the particles.

The PEG can have a PEG perfume load level. The PEG perfume load level is the ratio of the mass of perfume in the PEG to the mass of PEG. The PEG perfume load level may be at least 1:10, at least 1:6, at least 1:4, at least 1:2, at least 1:1 or any ranges therebetween.

Effervescent System

The Effervescent Perfume Particles may comprise from 10% to 60%, from 10% to 50%, from 10% to 40%, from 15% to 30%, of an effervescent system by total weight of said particles.

Any effervescent system known in the art can be used in the Effervescent Perfume Particles. A preferred effervescent system for incorporation in the Effervescent Perfume Particles, comprises an acid source and an alkali source, capable of reacting with each other in the presence of water to produce a gas.

The acid source component may be any organic, mineral or inorganic acid, or a derivative thereof, or a combination thereof. The acid source component may comprise an organic acid. The acid compound may be substantially anhydrous or non-hygroscopic and the acid may be water-soluble. It may be preferred that the acid source is overdried.

Suitable acids source components include citric acid, malic acid, tartaric acid, fumaric acid, adipic acid, maleic acid, aspartic acid, glutaric acid, malonic acid, succinic acid, boric acid, benzoic acid, oleic acid, citramalic acid, 3-chetoglutaric acid or any combinations thereof. Citric acid, maleic or tartaric acid are especially preferred. The acid source may be further coated with a coating such as a salt. In an embodiment, citric acid as the acid source may be coated with sodium citrate.

Any alkali source which has the capacity to react with the acid source to produce a gas may be present in the particle, which may be any gas known in the art, including nitrogen, oxygen and carbon dioxide gas. Preferred can be an alkali source that is selected from the group consisting of a carbonate salt, a bicarbonate salt, a sesquicarbonate salt and any combinations thereof. The alkali source may be substantially anhydrous or non-hydroscopic. It may be preferred that the alkali source is overdried.

Preferably this gas is carbon dioxide, and therefore the alkali source may be a source of carbonate, which can be any source of carbonate known in the art. In a preferred embodiment, the carbonate source is a carbonate salt. Examples of preferred carbonates are the alkaline earth and alkali metal carbonates, including sodium or potassium carbonate, bicarbonate and sesqui-carbonate and any combinations thereof with ultra-fine calcium carbonate or sodium carbonate. Alkali metal percarbonate salts are also suitable sources of carbonate species, which may be present combined with one or more other carbonate sources.

The molar ratio of acidic functional groups of the acid source to basic functional groups of the alkali source is from 10:1 to 1:10, from 5:1 to 1:5, from 3:1 to 1:3, yet from 2:1 to 1:2, from 1.2:1 to :1:1.2. In a preferred embodiment, molar ratio of acidic functional groups of the acid source to basic functional groups of the alkali source is from 1.1:1 to 1:1.1. Without being bounded to any theory, it is believed that an optimal kinetics of dissolution may be achieved when molar ratio of acidic functional groups of the acid source to basic functional groups of the alkali source is within a preferred range.

Surfactants

The Effervescent Perfume Particles may further comprise one or more surfactants. Any appropriate surfactants may be incorporated into the Effervescent Perfume Particles in order to further improve cleaning performance and/or achieve any other benefits. Particularly, cationic, anionic, nonionic surfactants, zwitterionic surfactants, amphoteric surfactants or any combinations thereof may be included in the particles. The particles may comprise from about 0.01% to about 20%, from about 0.1% to about 15%, from about 0.5% to about 10%, from about 1% to about 5%, of one or more surfactants by total weight of the particles.

Suitable anionic surfactants include: alkyl sulphates; alkyl sulphonates; alkyl phosphates; alkyl phosphonates; alkyl carboxylates; and combinations thereof. Preferred anionic surfactants include: linear or branched, substituted or unsubstituted alkyl benzene sulphonate, linear $C_8$-$C_{18}$ alkyl benzene sulphonate; linear or branched, substituted or unsubstituted alkyl benzene sulphate; linear or branched, substituted or unsubstituted alkyl sulphate, including linear $C_8$-$C_{18}$ alkyl sulphate, $C_1$-$C_3$ alkyl branched $C_8$-$C_{18}$ alkyl sulphate, linear or branched alkoxylated $C_8$-$C_{18}$ alkyl sulphate and combinations thereof; linear or branched, substituted or unsubstituted alkyl sulphonate; and combinations thereof.

Suitable cationic surfactants include: alkyl pyridinium compounds; alkyl quaternary ammonium compounds; alkyl quaternary phosphonium compounds; alkyl ternary sulphonium compounds; and combinations thereof. Preferred cationic surfactants are mono-C8-10 alkyl mono-hydroxyethyl di-methyl quaternary ammonium chloride, mono-C10-12 alkyl mono-hydroxyethyl di-methyl quaternary ammonium chloride and mono-C10 alkyl mono-hydroxyethyl di-methyl quaternary ammonium chloride.

Suitable non-ionic detersive surfactant can be selected from the group consisting of: C8-C18 alkyl ethoxylates, such as, NEODOL® non-ionic surfactants from Shell; C6-C12 alkyl phenol alkoxylates wherein the alkoxylate units are ethyleneoxy units, propyleneoxy units or a combination thereof; C12-C18 alcohol and C6-C12 alkyl phenol condensates with ethylene oxide/propylene oxide block polymers such as Pluronic® from BASF; C14-C22 mid-chain branched alcohols; C14-C22 mid-chain branched alkyl alkoxylates, BAEx, wherein x=from 1 to 30; alkylpolysaccharides, specifically alkylpolyglycosides; polyhydroxy fatty acid amides; ether capped poly(oxyalkylated) alcohol surfactants; and combinations thereof.

Alternatively, the Effervescent Perfume Particles may be substantially free of surfactants, or free of surfactants. The particles can comprise less than about 3% by weight of the particles, alternatively less than about 2% by weight of the particles, alternatively less than about 1% by weight of the particles, alternatively less than about 0.1% by weight of the particles, of surfactants.

Co-Carrier

The Effervescent Perfume Particles may further comprise a co-carrier. The co-carrier may function together with the polyalkylene glycol as the carrier to deliver the actives including a perfume and/or improving perfume stability from the time of manufacture to the time of purchase and/or further improving dissolution when the particles are added into water.

The co-carrier may be selected from the group consisting of starch, polyalkylene oxides such as polyethylene oxide (PEO), polypropylene oxide (PPO) or block copolymers of PEO/PPO (for example Pluronic), PEG fatty ester, PEG fatty alcohol ether, stearic acid, glycerol, ethoxylated nonionic surfactant having a degree of ethoxylation greater than 30; polyvinyl alcohol; and any combinations thereof.

The co-carrier may be present in any appropriate percentage in the particles according to the present disclosure, for example from about 0.01% to about 40%%, from about 0.1% to about 30%, about from about 0.5% to about 25%, about from about 1% to about 20%, for example about 1%, about 2%, about 4%, about 5%, about 6%, about 8%, about 10%, about 15% or any ranges therebetween, by weight of the particles.

Binder

The Effervescent Perfume Particles may further comprise a binder. The binder may function as facilitating to maintain the integrity of particles (i.e., to hold ingredients in a particle together and to ensure particles can be formed with required mechanical strength) and/or improving perfume stability from the time of manufacture to the time of purchase and/or further improving dissolution when the particles are added into water.

The binder may be selected from the group consisting of lactose, dextrose, sucrose, maltodextrin or hydrogenated dextrin, cellulose or modified cellulose, sugar alcohols, gelatin or derivatives thereof, polyvinyl alcohols (PVA), polyvinylpyrrolidone (PVP), copolymers of PVA/PVP, and any combinations thereof. In some embodiments, the binder may be selected from the group consisting of PVA, PVP, copolymers of PVA/PVP, lactose, dextrose, microcrystalline cellulose, hydroxypropyl methylcellulose and any combinations thereof.

The binder may be present in any appropriate percentage in the particles according to the present disclosure, for example from about 0.01% to about 50%%, from about 0.1% to about 30%, about from about 0.5% to about 20%, about from about 1% to about 10%, for example about 1%, about 2%, about 4%, about 5%, about 6%, about 8%, about 10%, about 20% or any ranges therebetween, by weight of the particles.

Particularly, the binder may comprise microcrystalline cellulose. Microcrystalline cellulose (MCC), $(C_6H_{10}O_5)_n$, is a refined wood pulp that is commonly used as a texturizer, an anti-caking agent, a fat substitute, an emulsifier, an extender, and/or a bulking agent in food production. More particularly, the particles may comprise from about 0.1% to about 5%, from 0.5% to about 3%, from 1% to about 2%, by weight of microcrystalline cellulose, for example Emcocel®. Another advantage of including microcrystalline cellulose is to reduce hygroscopicity (for example, to prevent moisture pick up) and stickiness of the particles.

Lubricant

The Effervescent Perfume Particles may further comprise a lubricant. The lubricant may function to facilitate the manufacturing process (e.g., the tableting process).

The lubricant may be selected from the group consisting of stearates such as magnesium stearate, calcium stearate, or zinc stearate; benzoate such as sodium benzoate; talc; behenates such as glyceryl bchenate or glyceryl dibchenate; sodium acetate; silica; polyethylene glycol having a weight average molecular weight from 1000 to 6000; and any combinations thereof.

The lubricant may be present in any appropriate percentage in the particles according to the present disclosure, for example from about 0.01% to about 40%, from about 0.1% to about 30%, about from about 0.5% to about 10%, about from about 1% to about 5%, for example about 1%, about 2%, about 3%, about 4%, about 5%, about 6%, about 8%, about 10% or any ranges therebetween, by weight of the particles.

Perfume

The Effervescent Perfume Particles may comprise an unencapsulated perfume (i.e., neat perfume) and/or encapsulated perfume (e.g. microcapsules). The Effervescent Perfume Particles may comprise unencapsulated perfume and can be essentially free of perfume carriers, such as a perfume microcapsule. Optionally, the Effervescent Perfume Particles may comprise perfume carrier materials (and perfume contained therein). Specific examples of perfume carrier materials may include cyclodextrin and zeolites.

The Effervescent Perfume Particles may comprise from 3% to 40%, from 7% to 35%, from 10% to 30%, about 12% to 25%, of perfume by total weight of the particles.

The particles can comprise about 0.1% to about 50%, alternatively about 1% to about 40%, alternatively 2% to about 30%, alternatively combinations thereof and any whole percentages within any of the aforementioned ranges, of perfume by total weight of the particles. The perfume can be unencapsulated perfume and/or encapsulated perfume.

The Effervescent Perfume Particles may comprise unencapsulated perfume and be free or essentially free of a perfume carrier. The Effervescent Perfume Particles may comprise about 0.1% to about 50%, alternatively about 1% to about 40%, alternatively 2% to about 30%, alternatively combinations thereof and any whole percentages within any of the aforementioned ranges, of unencapsulated perfume by total weight of the particles.

The Effervescent Perfume Particles may comprise unencapsulated perfume and perfume microcapsules. The Effervescent Perfume Particles may comprise about 0.1% to about 50%, alternatively about 1% to about 40%, alternatively from about 2% to about 30%, alternatively combinations thereof and any whole percentages or ranges of whole percentages within any of the aforementioned ranges, of the unencapsulated perfume and perfume microcapsules by total weight of the particles.

The Effervescent Perfume Particles may comprise unencapsulated perfume and perfume microcapsules but be free or essentially free of other perfume carriers. The particles may comprise unencapsulated perfume and perfume microcapsules and be free of other perfume carriers.

The Effervescent Perfume Particles may comprise encapsulated perfume. Encapsulated perfume can be provided as plurality of perfume microcapsules. A perfume microcapsule is perfume oil enclosed within a shell. The shell can have an average shell thickness less than the maximum dimension of the perfume core. The perfume microcapsules, if present, can be moisture activated perfume microcapsules. The Effervescent Perfume Particles may comprise starch encapsulated perfume.

The perfume microcapsules can comprise a melamine/formaldehyde shell and/or a poly(meth)acrylate shell. Perfume microcapsules may be obtained from Appleton, Quest International, or International Flavor & Fragrances, or other suitable source. The perfume microcapsule shell can be coated with polymer to enhance the ability of the perfume microcapsule to adhere to fabric.

The Effervescent Perfume Particles can comprise about 0.1% to about 50%, alternatively about 1% to about 40%, alternatively about 2% to about 30%, alternatively combinations thereof and any whole percentages within any of the aforementioned ranges, of encapsulated perfume by total weight of the particles.

The Effervescent Perfume Particles can comprise perfume microcapsules but be free of or essentially free of unencapsulated perfume. The particles may comprise about 0.1% to about 50%, alternatively about 1% to about 40%, alternatively about 2% to about 30%, alternatively combinations thereof and any whole percentages within any of the aforementioned ranges, of encapsulated perfume by total weight of the particles.

Dye

The Effervescent Perfume Particles may comprise dye. The dye may include those dyes that are typically used in home care (for example hard surface cleaners, dish washing) or home care products (for example hard surface cleaner). The Effervescent Perfume Particles may comprise less than about 0.1%, alternatively about 0.001% to about 0.1%, alternatively about 0.003% to about 0.02%, alternatively combinations thereof and any hundredths of percent or ranges of hundredths of percent within any of the aforementioned ranges, of dye by total weight of the particles. Examples of suitable dyes include, but are not limited to, LIQUITINT PINK AM, AQUA AS CYAN 15, and VIOLET FL, available from Milliken Chemical. Employing a dye can be practical to help the user differentiate between particles having differing scents.

Particles

Effervescent Perfume Particles may be formed by various processes including extrusion, molding, rotoforming, tableting and the like.

In an embodiment, Effervescent Perfume Particles can be formed in a prilling and tableting process (also called spray congealing and tableting process). Particularly, a slurry comprising a molten carrier (e.g., polyalkylene glycol and optionally a co-carrier) and perfume is prepared and maintained in a temperature above its melting point (e.g., 60-70° C. or even higher temperature). The slurry is then atomized through an atomizer into a cooling chamber maintained at a temperature below the melting point of said polyalkylene glycol resulting in the formation of microparticles containing the polyalkylene glycol and the perfume (i.e., the molten droplets solidify upon cooling in the chamber). Subsequently, the microparticles comprising the carrier and perfume is mixed with an additional powder comprising the effervescent system. The mixed powder is then compressed into particles (e.g. tablets). Such process is preferred for the effervescent system that is not stable under the elevated temperature and/or the environment of the molten carrier. More particularly, a tableting machine comprising a plurality of pairs of upper punch and lower punch is employed for the tableting process comprising a filing step, a compression step and an ejection step. In the filing step, the mixed powder is filled into the bore of the lower punch. In the compression step, the upper punch and/or the lower punch vertically move to compress the mixed powder so as to form solid particles (e.g., tablets). In the ejection step, the solid particles are ejected.

In an embodiment, Effervescent Perfume Particles can be formed in a low heat spray drying and tableting process. Particularly, the low heat spray drying process comprising: forming a slurry comprising a liquid solvent, a molten carrier (e.g., polyalkylene glycol and optionally a co-carrier) and perfume (e.g. starch encapsulated perfume); applying an electrostatic charge to the slurry; atomizing the charged slurry to produce a plurality of electrostatically charged, wet particles; suspending the electrostatically charged, wet particles for a sufficient time to permit repulsive forces induced by the electrostatic charge on at least some wet particles to cause at least some of such particles to divide into wet sub-particles; and continuing the suspending step, without the presence of any heated drying fluids, for a sufficient time to drive off a sufficient amount of the liquid solvent within most of the wet particles to leave a plurality of dried particles (the powder), each dried particle containing the active ingredient encapsulated within the carrier. Subsequently, the microparticles comprising the carrier and perfume is mixed with an additional powder comprising the effervescent system. The mixed powder is then compressed into particles (e.g. tablets). A temperature of the non-heated drying fluid is less than about 100° C. at introduction into the drying chamber, such as at least one of: less than about 75° C. at introduction into the drying chamber.

In another embodiment, Effervescent Perfume Particles can be practically formed by processing a melt of the composition that subsequently forms the particles. The melt of the Effervescent Perfume Particles may be prepared in either batch or continuous mode. In batch mode, molten PEG is loaded into a mixing vessel having temperature control. Effervescent system can then be added and mixed with PEG until the mixture is substantially homogeneous. Other ingredients (for example, a binder, a surfactant and the like), if present, can then be added and mixed until the mixture is substantially homogeneous. Perfume can be added to the PEG. The mixture can be mixed until the mixture is substantially homogeneous. Encapsulated perfume, if present, can be added and mixed until the mixture is substantially homogeneous. Dye, if present, can then be added to the vessel and the components are further mixed for a period of time until the entire mixture is substantially homogeneous. In continuous mode, molten PEG is mixed with the effervescent system in an in-line mixer such as a static mixer or a high shear mixer and the resulting substantially homogeneous mixture is then used to make the particles. Other ingredients, if present, perfume microcapsules, if present, and unencapsulated perfume, if present, can be added to PEG in any order or simultaneously and dye can be added at a step prior to making the particles or any other suitable time. The term of "substantially homogeneous" used herein means that the particles arc of uniform composition throughout. In other words, ingredients in the particles are substantially evenly distributed throughout the particles. Particularly, the particles do not have a core or a coating.

The Effervescent Perfume Particles may have a variety of shapes. The particles may be formed into different shapes include tablets, pills, spheres, and the like. The Effervescent Perfume Particles may have a shape selected from a group consisting of spherical, hemispherical, compressed hemispherical, lentil shaped, oblong, cylinder and rod. Lentil shaped refers to the shape of a lentil bean. Compressed hemispherical refers to a shape corresponding to a hemisphere that is at least partially flattened such that the curvature of the curved surface is less, on overage, than the curvature of a hemisphere having the same radius. A compressed hemispherical particle can have a ratio of height to diameter of from about 0.01 to about 0.4, alternatively from about 0.1 to about 0.4, alternatively from about 0.2 to about 0.3. Oblong shaped refers to a shape having a maximum dimension and a maximum secondary dimension orthogonal to the maximum dimension, wherein the ratio of maximum dimension to the maximum secondary dimension is greater than about 1.2. An oblong shape can have a ratio of maximum dimension to maximum secondary dimension greater than about 1.5. An oblong shape can have a ratio of maximum dimension to maximum secondary dimension greater than about 2. Oblong shaped particles can have a maximum dimension from about 2 mm to about 15 mm and a maximum secondary dimension of from about 2 mm to about 10 mm. Oblong shaped particles can have a maximum dimension from about 2 mm to about 10 mm and a maximum secondary dimension of from about 2 mm to about 7 mm. Oblong shaped particles can have a maximum dimension from about 2 mm to about 6 mm and a maximum secondary dimension of from about 2 mm to about 4 mm.

In a particular embodiment, the Effervescent Perfume Particles can be made according to the following process. Molten PEG can be provided. The effervescent system can be premixed with the PEG prior to forming the melt, for example to simplify material handling and or minimize the number of tanks required to manufacture the particles. Perfume can be mixed with the PEG. Together, the molten PEG, the effervescent system, and perfume can form a melt. The melt can be formed into particles. Optionally, perfume microcapsules can be mixed with the PEG. The particles can be formed by passing the melt through small openings. The particles can be formed by depositing the melt in a mold. The particles can be formed by spraying the melt onto a chilled surface. The chilled surface can be a chilled drum. The chilled drum can be a rotating chilled drum.

Effervescent Perfume Particles has an oblong shape. For particles produced from a melt, an oblong shape can be an indication that suitable processing conditions are being employed with respect to one or more of temperature of the melt, conveyor surface speed, conveyor surface temperature, or other process condition. When a melt from which particles are prepared is at a sufficiently high temperature, the melt will tend to flow and a surface of the yet to be formed particle will spread out in the machine direction of the conveyor surface after the melt is deposited on the conveyor surface. If the temperature of the melt is too low, forming substantially uniformly shaped particles can be challenging.

Optionally, for any of the formulations disclosed herein, individual particles can have a mass from about 0.95 mg to about 5 g, alternatively from about 0.95 mg to about 2 g, alternatively from about 10 mg to about 1 g, alternatively from about 10 mg to about 500 mg, alternatively from about 10 mg to about 250 mg, alternatively from about 0.95 mg to about 125 mg, alternatively combinations thereof and any whole numbers or ranges of whole numbers of mg within any of the aforementioned ranges. In a plurality of particles, individual particles can have a shape selected from the group consisting of spherical, hemispherical, compressed hemispherical, lentil shaped, and oblong.

An individual particle may have a volume from about 0.003 $cm^3$ to about 5 $cm^3$. An individual particle may have a volume from about 0.002 $cm^3$ to about 1 $cm^3$. An individual particle may have a volume from about 0.01 $cm^3$ to about 0.5 $cm^3$. An individual particle may have a volume from about 0.05 $cm^3$ to about 0.2 $cm^3$. Smaller particles are thought to provide for better packing of the particles in a container and faster dissolution in the wash.

An individual particle may have a height between 1 mm and 8 mm, 3 mm and 6 mm, 4 mm and 6 mm. A plurality of particles may have a distribution of heights, wherein said distribution has a mean height between 1 mm and 8 mm, 3 mm and 6 mm, 4 mm and 6 mm, and a standard deviation of from about 0.05 to about 0.6, from about 0.1 to about 0.5, from about 0.2 to about 0.4.

The composition can comprise particles that are retained on a number 10 sieve as specified by ASTM International, ASTM E11-13. The composition can comprise particles wherein more than about 50% by weight of the particles are retained on a number 10 sieve as specified by ASTM International, ASTM E11-13. The composition can comprise particles wherein more than about 70% by weight of the particles are retained on a number 10 sieve as specified by ASTM International, ASTM E11-13. The composition can comprise particles wherein more than about 90% by weight of the particles are retained on a number 10 sieve as specified by ASTM International, ASTM E11-13. It can be desirable to provide particles sized as such because particles retained on a number 10 sieve me be easier to handle than smaller particles.

The composition can comprise particles that pass a sieve having a nominal sieve opening size of 22.6 mm. The composition can comprise particles that pass a sieve having a nominal sieve opening size of 22.6 mm and are retained on a sieve having a nominal sieve opening size of 0.841 mm. Particles having a size such that they are retained on a sieve having a nominal opening size of 22.6 mm may tend to have a dissolution time that is too great for a common wash cycle. Particles having a size such that they pass a sieve having a nominal sieve opening size of 0.841 mm may be too small to conveniently handle. Particles having a size within the aforesaid bounds may represent an appropriate balance between dissolution time and case of particle handling.

A plurality of particles may collectively comprise a dose for dosing to water in a bucket together with a hard surface cleaner. Alternatively, a plurality of particles may collectively comprise a dose for dosing in a spray format.

The dosage of the Effervescent Perfume Particles may be from about 0.001 g/L to about 100 g/L, from about 0.1 g/L to about 1.5 g/L, from about 0.2 g/L to about 1.3 g/L, from about 0.3 g/L to about 1.2 g/L, alternatively from about 0.01 g/L to about 0.5 g/L, alternatively from about 0.5 g/L to about 5 g/L, alternatively from about 1 g/L to about 10 g/L, for example 0.01 g/L, 0.05 g/L, 0.1 g/L, 0.2 g/L, 0.3 g/L, 0.5 g/L, 1 g/L, 2 g/L, 5 g/L, 10 g/L, 15 g/L, 20 g/L or any ranges therebetween.

A typical process for forming Effervescent Perfume Particles comprises the steps of: providing a precursor material (for example, a homogeneous mixture of raw materials) to a feed pipe; providing a distributor comprising a plurality of apertures; transporting the precursor material from the feed pipe to the distributor; passing the precursor material through the apertures; providing a moveable conveyor beneath the apertures; depositing the precursor material onto the moveable conveyor; and cooling the precursor material to form a plurality of particles.

A typical apparatus for forming Effervescent Perfume Particles comprises: a batch mixture; a feed pipe downstream of the batch mixture; a distributor downstream of the feed pipe, wherein the distributor comprises a plurality of apertures; and a conveyor beneath the apertures and movable in translation relative to the distributor.

A typical process for forming Effervescent Perfume Particles comprises the steps of: providing a precursor material in a batch mixer in fluid communication with a feed pipe; providing the precursor material to the feed pipe from the batch mixer; providing a distributor comprising a plurality of apertures; transporting the precursor material from the feed pipe to the distributor; passing the precursor material through the apertures; providing a moveable conveyor beneath the apertures; depositing the precursor material onto the moveable conveyor; and cooling the precursor material to form a plurality of particles.

The Effervescent Perfume Particles may be manufactured by a pastillation process. A schematic of a pastillation apparatus 100 is illustrated in FIG. 1. The steps of manufacturing according to such process can comprise providing the desired formulation as a viscous material 50. The viscous material 50 can comprise or consists of any of the formulations disclosed herein.

The viscous material 50 may comprise more than about 40% of molten PEG having a weight average molecular weight from about 5000 to about 11000, from about 0.1% to about 20% of perfume, and more than about 40% of effervescent system, by weight of the viscous material 50, wherein the viscous material 50 is formed into a plurality of particles 30, each of the particles 30 having a continuous phase of the PEG; wherein each of the particles 30 have a mass between about 0.95 mg to about 5 grams. The viscous material 50 can be provided at a processing temperature less than about 20 degrees Celsius above the onset of solidification temperature as determined by differential scanning calorimetry.

The viscous material 50 can be passed through small openings 10 and onto a moving conveyor surface 20 upon which the viscous material 50 is cooled below the glass transition temperature to form a plurality of particles 30. As illustrated in FIG. 1, the small openings 10 can be on a rotatable pastillation roll 5. Viscous material 50 can be distributed to the small openings 10 by a viscous material distributor 40. Particles can be formed on a ROTOFORMER, available from Sandvik Materials Technology, such as a Sandvik Rotoform 3000 having a 750 mm wide 10 m long belt. The cylinder of such rotoformer can have 2 mm diameter apertures set at 10 mm pitch in the cross machine direction and 9.35 mm in the machine direction. The cylinder of such rotoformer can be set 3 mm above the belt. The belt speed and rotational speed of the rotoformer can be 10 m/min. The melt can be fed to such rotoformer at 3.1 kg/min from a mixer and be at a temperature of about 50° C.

Each of the particles 30 can be substantially homogeneously structured. A substantially homogenously structured particle 30 is a particle in which the component materials forming the particle 30 are substantially homogenously mixed with one another. A substantially homogenously structure particle 30 need not be perfectly homogeneous. There may be variations in the degree of homogeneity that is within limits of mixing processes used by those skilled in the art in commercial applications. Each of the particles 30 can have a continuous phase of the PEG. Each of the particles 30 can be a continuous phase of a mixture of the component materials forming the particle. So, for instance, if the particles comprise component materials A, B, and C, the particles 30 can be a continuous phase of a mixture A, B, and C. The same can be said for any number of component materials forming the particles 30, by way of nonlimiting example, three, four, five, or more component materials.

A homogeneously structured particle 30 is not a particle that has a core and a coating, the particle being discrete from other particles having the same structure. In some instances, a homogeneously structured particle 30 can be non-mechanically separable. That is, the component materials forming the homogeneously structured particle 30 may not be mechanically separated, for instance by a knife or fine pick. When the particles 30 are taken together as the composition, the composition can be substantially free from or even free from coated inclusions.

Homogeneously structured particles 30 can be substantially free or free from inclusions having a size greater than about 500 μm. Homogeneously structured particles 30 can be substantially free from or free from inclusions having a size greater than about 200 μm. Homogenously structured particles 30 can be substantially free from or free from inclusions having a size greater than about 100 μm. Without being bound by theory, an abundance of large inclusions may be undesirable because they might interfere with the dissolution of the particle 30 in the wash or leave visually perceptible residue on the articles being washed.

As used herein, size refers to the maximum dimension. A cross section of a homogeneously structured particle 30 does not reveal an overall structure of the particle to be a core and coating. M&M'S candy marketed by Mars, Incorporated, which is a chocolate core having a sugar coating, is not a homogeneously structured particle. In the case of M&M'S candy, the chocolate core and coating are mechanically separable. A chocolate covered raisin is similarly not a homogeneously structured particle. A homogeneously structured particle 30 is not a coated particle.

Figure 2:
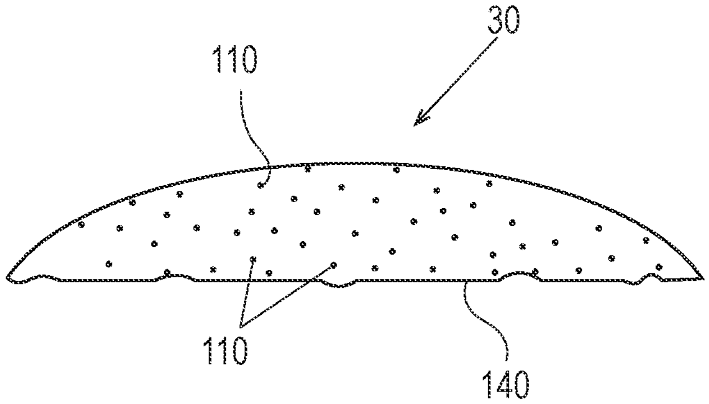
FIG. 2 is a cross-sectional view of an Effervescent Perfume Particle, according to one embodiment of the present invention.

A schematic view of a substantially homogeneous structured particle 30 is shown in FIG. 2. As shown in FIG. 2, the perfume 110 can be substantially randomly dispersed in the particles. The perfume 110 can be unencapsulated perfume and or perfume microcapsules. As shown in FIG. 2, a substantially homogeneously structured particle 30 is not a particle having a core and coating arrangement. Rather, the constituent components of the formula are substantially homogenously mixed with one another. Without being bound by theory, substantially homogeneous structured particles 30 are thought to possibly be less capital intense to produce and the processes to produce such particles 30 are thought to result in more uniform particles which are more acceptable to the consumer.

The particles 30 can have a substantially flat base 140. The particles 30 can have a flat base 140. The particles 30 can have a flat or substantially flat base 140. A flat base 140 or substantially flat base 140 can be beneficial because it can provide visual indicia of suitable processing conditions with respect to one or more of temperature of the melt, conveyor surface speed, conveyor surface temperature, or other process condition. When a melt from which particles 30 are prepared is at a sufficiently high temperature, the melt will tend to flow and a surface of the yet to be formed particle 30 will conform to the surface of the conveyor surface. If the temperature of the melt is too low, forming uniformly shaped particles 30 can be challenging.

The particles 30 can have a substantially circular flat base 140. The substantially circular flat base 140 can have a diameter between about 1 mm and about 12 mm. The substantially circular flat base 140 can have a diameter between about 2 mm and about 8 mm. The substantially circular flat base 140 can have a diameter between about 4 mm and about 6 mm.

Occlusions of Gas

Effervescent Perfume Particles may comprise occlusions of gas. Particularly, the particles may have a density less than about 0.95 g/cm$^3$. The occlusions of gas within the particle may comprise between about 0.5% to about 50% by volume of the particle.

Gas may be introduced into the particles by any known approaches. For instance, a gas can be introduced into the mixture of raw materials while the raw materials are being mixed. A typical process for forming particles comprising occlusions of gas may comprise the following steps: providing one or more raw materials to a feed pipe; entraining a gas into the raw materials; providing a distributor comprising a plurality of apertures; transporting the raw materials from the feed pipe to the distributor; passing the raw materials through the apertures; providing a moveable conveyor beneath the apertures; depositing the raw materials onto the moveable conveyor; and cooling the raw materials to form a plurality of particles. A typical apparatus for forming particles comprising occlusions of gas may comprise: a feed pipe; a gas feed line mounted in fluid communication with the feed pipe downstream of the batch mixer; a mill downstream of the gas feed line and in line with the feed pipe; a distributor downstream of the mill and in fluid communication with the feed pipe, wherein the distributor comprises a plurality of apertures; and a conveyor beneath the cylinder and movable in translation relative to the distributor. The gas provided in the gas feed line can be selected from the group consisting of air, oxygen, nitrogen, carbon dioxide, argon, and combinations thereof. Such gasses are widely available and commonly used in commercial applications. Without being bound by theory, the presence of occlusions of gas might improve the stability and/or the dissolution performance of the particles.

Method of Making a Composition

The present disclosure further provides a method of making a composition comprising a plurality of particles that comprise polyalkylene glycol having a weight average molecular weight from 2000 to 40000 and perfume. Particularly, the method includes a rotoforming method, an extrusion method, a molding method and a prilling-and-tableting method.

Particularly, the prilling-and-tableting method may comprise the steps of: 1) providing a slurry comprising: (a) from 20% to 90%, from 30% to 80%, from 40% to 70%, from 45% to 60%, of molten polyalkylene glycol by total weight of the slurry, (b) from 10% to 80%, from 20% to 70%, from 30% to 60%, from 40% to 55%, of the perfume by total weight of the slurry; 2) atomizing the slurry through an atomizer into a chamber maintained at a temperature below the melting point of the polyalkylene glycol resulting in the formation of microparticles containing the polyalkylene glycol and the perfume; 3) mixing the microparticles with a powder comprising an effervescent system to form a mixed powder in which the weight ratio of the microparticles to the powder is from 5:1 to 1:5, from 4:1 to 1:2, from 3:1 to 1:1; and 4) compressing the mixed powder into particles. The powder may further comprise one or more ingredients selected from the group consisting of a binder, a surfactant, a co-carrier, and a lubricant.

In a conventional tableting process in the industries of pharmaceutical and food, perfume is added by spraying onto a mixture of powder and then using either dry or wet granulation with binders and/or lubricants. However, the conventional approach does not work when a high level of perfume (e.g., more than 5% or even more than 10%) is needed to add, because it may bring about various problems, such as poor flowability, caking, and/or poor dissolution.

The present inventors have creatively developed a method of making a plurality of particles containing perfume, which can achieve a high load of perfume.

It is an advantage of the method according to the present disclosure that particles such as tablets with a high loading of perfume can be prepared in which the particles may dissolve rapidly and have an improved stability compared to particles obtained by other processing routes.

It is another advantage of the method according to the present disclosure that it opens up also the possibility to incorporate temperature sensitive technologies into the particles which is not possible in other processing routes (e.g. Rotoforming or extrusion).

Package

A unit dose or a plurality of unit doses may be contained in a package. The package may be a bottle, bag, carton, or other container. In one embodiment, the package is a bottle, e.g. a PET bottle, comprising a translucent portion to showcase the particles to a viewing consumer. In another embodiment, the package is a carton box, made of recycled paper, carton, wood, grass or any combinations thereof. In one embodiment, the package comprises a single unit dose (e.g., trial size sachet); or multiple unit doses (e.g., from 15 unit doses to 30 unit doses).

A single unit dose may comprise from about 2 g to about 50 g, from about 5 g to about 40 g, from about 10 g to 30 g, of particles according to the present disclosure. Additionally, the package may have a moisture barrier suitable with the effervescent composition to ensure the product maintains its quality throughout the shelf life.

Dosing

The aforementioned package may comprise a dosing means for dispensing the particles from the package to a bucket (or cleaning basin) or spray. The user may use the dosing means to meter the recommended unit dose amount or simply use the dosing means to meter the particles according to the user's own scent preference. Examples of a dosing means may be a dispensing cap, dome, or the like, that is functionally attached to the package. The dosing means can be releasably detachable from the package and re-attachable to the package, such as for example, a cup mountable on the package. The dosing means may be tethered (e.g., by hinge or string) to the rest of the package (or alternatively un-tethered). The dosing means may have one or more demarcations (e.g., fill-line) to indicate a recommend unit dose amount. The packaging may include instructions instructing the user to open the removable opening of the package, and dispense (e.g., pour) the particles contained in the package into the dosing means. Thereafter, the user may be instructed to dose the particles contained in the dosing means to a bucket or cleaning basin. The particles of the present disclosure may be used to add freshness to hard surface. The package including the dosing means may be made of plastic.

Method of Cleaning a Hard Surface

The composition according to the present disclosure may be used for cleaning a hard surface. For general cleaning, especially of floors, a preferred method of cleaning may comprise the steps of: a) diluting the composition to a dilution level of from 0.05% to 5% by volume, and b) applying the diluted composition to a hard surface.

In preferred embodiments, the composition may be diluted to a level of from 0.2% to 4% by volume, from 0.3% to 2% by volume. In preferred embodiments, the composition is diluted with water.

The dilution level is expressed as a percent defined as the fraction of the composition, by volume, with respect to the total amount of the diluted composition. For example, a dilution level of 5% by volume is equivalent to 50 ml of the composition being diluted to form 1000 ml of diluted composition.

The diluted composition can be applied by any suitable means, including using a mop, sponge, or other suitable implement. The hard surface may be rinsed, with clean water, in an optional further step.

Alternatively, and especially for particularly dirty or greasy spots, the compositions can be applied neat to the hard surface. By "neat", it is to be understood that the liquid composition is applied directly onto the surface to be treated without undergoing any significant dilution, i.e., the liquid composition herein is applied onto the hard surface as described herein, either directly or via an implement such as a sponge, without first diluting the composition. By significant dilution, what is meant is that the composition is diluted by less than 10 wt %, less than 5 wt %, less than 3 wt %. Such dilutions can arise from the use of damp implements to apply the composition to the hard surface, such as sponges which have been "squeezed" dry.

The term of “hard surface” as used herein may cover a surface of any hard article including but not limited to metal, glass, ceramics, plastics, wood, natural or artificial stone, and cement. In an embodiment of the present invention, said hard surface is horizontal, inclined or vertical. Horizontal surfaces include floors, kitchen work surfaces, tables and the like. Inclined or vertical hard surfaces include mirrors, lavatory pans, urinals, drains, waste pipes and the like.

In another embodiment of the present invention, said method of cleaning a hard surface includes the steps of applying, said liquid composition onto said hard surface either through the means of an implement or sprayed directly, optionally leaving said liquid composition to act onto said surface for a period of time to allow said composition to act, and optionally removing said liquid composition, removing said liquid composition by rinsing said hard surface with water and/or wiping said hard surface with an appropriate instrument, e.g., a mop, sponge, a paper or cloth towel and the like.

EXAMPLES

Example 1: Preparation of the Effervescent Perfume Particles (1) Rotoforming Process Several Comparative Beads 1 to 4 (Non-Effervescent Perfume Particles) and several inventive Beads 1 to 8 (Effervescent Perfume Particles) according to the present disclosure are prepared as follows. Liquid or solid PEG is heated up to 75° C. in a controlled oven and then ideally maintained in a heat jacketed beaker and continuously stirred at constant speed to keep a homogeneous hot paste. First the perfume ingredients (Perfume A to D) are added while continuously stirring. For Beads 1 to 8, subsequently, the effervescent system (that is, tartaric acid and sodium carbonate) are added either separately or together as an agglomerate to the hot paste. Then the binder (that is, Emocel®) is added. Optionally, further additives such as dye may be added. Finally, the hot pastes are spread on a mould with cavities and then cooled to form a plurality of particles, i.e., Comparative Beads 1 to 4 and Beads 1 to 8. The size and geometry of the beads are the same with Downy Unstoppables. Perfumes A to D are unencapsulated perfume (i.e., neat perfume). Detailed compositional breakdown of the particle composition is listed as below (see Table 1A and 1B).

TABLE 1A

| Ingredients (parts by weight) | Compar. Bead 1 | Compar. Bead 2 | Compar. Bead 3 | Compar. Bead 4 | Bead 1 | Bead 2 |
|---|---|---|---|---|---|---|
| PEG 8000[1] | — | — | 75 | 88 | — | 38 |
| PEG 12000[1] | 95.00 | 80.00 | — | — | 47.5 | — |
| Tartaric acid | — | — | — | — | 27.55 | 24.36 |
| Sodium carbonate | — | — | — | — | 18.05 | 15.96 |
| Binder A[2] | — | — | — | — | 1.9 | 1.68 |
| Perfume A | 5.00 | — | — | — | 5.00 | — |
| Perfume B | — | 20.00 | — | — | — | 20.00 |
| Perfume C | — | — | 25.00 | — | — | — |
| Perfume D | — | — | — | 12.00 | — | — |
| Total parts | 100 | 100 | 100 | 100 | 100 | 100 |

[1]PEG 8000, 12000 from Alfa Aesar

[2]Emocel ® 50M, microcrystalline cellulose (MCC) available from JRS Pharma

TABLE 1B

| Ingredients (parts by weight) | Bead 3 | Bead 4 | Bead 5 | Bead 6 | Bead 7 | Bead 8 |
|---|---|---|---|---|---|---|
| PEG 8000[1] | — | 44.00 | — | 40.00 | — | 55.00 |
| PEG 12000 | 37.5 | — | 40.00 | — | 30.00 | — |
| Tartaric acid | 21.75 | 25.52 | 23.2 | 23.2 | 34.8 | 13.88 |
| Sodium carbonate | 14.25 | 16.72 | 15.2 | 15.2 | 22.8 | 13.88 |
| Binder A[2] | 1.5 | 1.76 | 1.6 | 1.6 | 2.4 | 2.24 |
| Perfume A | — | — | 20.00 | — | — | — |
| Perfume B | — | — | — | 20.00 | — | — |
| Perfume C | 25.00 | — | — | — | 10.00 | — |
| Perfume D | — | 12.00 | — | — | — | 15.00 |
| Total parts | 100 | 100 | 100 | 100 | 100 | 100 |

[1]PEG 8000, 12000 from Alfa Aesar

[2]Emocel ® 50M, microcrystalline cellulose (MCC) available from JRS Pharma (2) Tableting Process Inventive Beads 9 to 15 (Effervescent Perfume Particles) according to the present disclosure are prepared by using the tableting process as follows. Liquid or solid PEG is heated up to the melting point of PEG (e.g. 65° C.) in a controlled oven and then ideally maintained in a heat jacketed beaker and continuously stirred at constant speed to keep a homogeneous hot paste. The perfume ingredients (Perfume A to B) are added while continuously stirring to provide a slurry comprising the molten PEG and perfume. During the stirring, the temperature of the slurry is maintained between the melting point of the PEG/perfume mixture and the flash point of perfume, between the melting point of the PEG/perfume mixture plus 2 to 5° C. and the flash point of perfume minus 1 to 20° C. The slurry is then atomized through a rotary atomizer with a pressure nozzle into a cooling chamber maintained at a temperature below the melting point of the PEG/perfume mixture resulting in the formation of microparticles containing the PEG and the perfume.

Subsequently, the microparticles containing the PEG and perfume is mixed with an additional powder comprising the effervescent system and optionally other ingredients including the binder and the lubricant. The mixed powder is then compressed into tablets by using the following parameters:

Applied compression force: 1 kN to 25 kN;

Speed of tableting: 500,000-2 million tablets/h;

Tablet weight: 50-500 mg;

Shape of tablets: hemi-spherical.

Detailed compositional breakdown of the particle composition is listed as below (see Table 1C).

TABLE 1C

| Ingredients (parts by weight) | Bead 9 | Bead 10 | Bead 11 | Bead 12 | Bead 13 | Bead 14 | Bead 15 |
|---|---|---|---|---|---|---|---|
| PEG 8000[1] | 55.00 | 50.00 | 50.00 | 45.00 | 45.00 | 40.00 | 49.9 |
| Citric acid[2] | 15.00 | — | — | — | — | — | |
| Citric acid[3] | — | 15.00 | 10.00 | 15.00 | 15.00 | 20.00 | 11.5 |
| Sodium bicarbonate | 15.00 | 15.00 | 10.00 | 15.00 | 15.00 | 20.00 | 11.5 |
| Binder A[4] | — | — | 2.00 | — | 3.00 | — | 2.5 |
| Binder B[5] | — | — | 2.00 | — | — | 3.00 | 2.5 |
| Lubricant[6] | — | — | 1.00 | — | — | 2.00 | 2.0 |
| Pluronic[7] | — | — | — | 10.00 | 2.00 | — | — |
| Perfume A | 15.00 | 20.00 | — | — | — | — | — |
| Perfume B | — | — | 25.00 | 15.00 | 20.00 | 15.00 | 20 |
| Total parts | 100 | 100 | 100 | 100 | 100 | 100 | 100 |

[1]PEG 8000 from Alfa Aesar

[2]Citric acid without coating

[3]Citrate-coated citric acid, CITROCOAT ®N5000 from Jungbunzlauer S.A.

[4]Emocel ® 50M or Vivapur 102, microcrystalline cellulose (MCC) available from JRS Pharma

[5]Flowlac 90 Lactose available from Meggle.

[6]PEG 4000 from Alfa Aesar

[7]Pluronic ® from BASF

Example 2: Improved Dissolution Rate Achieved by the Effervescent Perfume Particles Dissolution rate test was conducted for the Effervescent Perfume Particles as prepared in Example 1. The time for complete dissolution of the Effervescent Perfume Particles in industrial water or in industrial water with all-purpose cleaner (APC) (Mr. Proper®) was determined. Test procedure is as follows: APC at recommended dosage (12 g/L) was mixed with 500 mL industrial water at two different temperatures (20° C. or 40° C.) in a 1 L glass beaker. 1 g/L beads were added to industrial water or the APC solution in the industrial water (i.e., 0.5 g for a 500 mL solution). Time was measured for beads to fully dissolve. Table 2 shows the results of dissolution test. Incorporation of the effervescent system in the particles results in a significant reduction of time for dissolution.

TABLE 2

| | Compar. Bead 4 | Bead 4 |
|---|---|---|
| | Time for dissolution (seconds) | |
| Industrial water cold[1] | 2183 | 297 |
| Industrial water warm[2] | 1223 | 58 |
| APC cold | 1928 | 596 |
| APC warm | 1441 | 171 |

[1]the temperature for cold: 20° C.

[2]the temperature for warm: 40° C.

Example 3: Improved Cleaning Index Achieved by the Effervescent Perfume Particles Unexpectedly, the present inventors discovered that the Effervescent Perfume Particles provide an extra benefit for cleaning performance, in additional to the fast dissolution. Particularly, Cleaning Index when using APC together with the Effervescent Perfume Particles is significantly improved in comparison with that when using APC alone. Even more surprisingly, when used at a certain range of concentrations, the Effervescent Perfume Particles alone (i.e., without the addition of APC) can provide an effective cleaning benefit.

(1) Synergistic Effect of the Combination of APC and the Effervescent Perfume Particles Cleaning performance test was carried out using APC (Mr. Proper®), the Effervescent Perfume Particles prepared in Example 1 as well as the combination of APC and the Effervescent Perfume Particles.

Cleaning performance tests are carried out with a well-known Industry method by using sheen machine. The test is done with soil mixture which consists of a mixture of consumer relevant soils such as oil, polymerized oil, particulates, pet hair, granulated sugar etc. A representative grease/particulate-artificial soil is prepared by the following steps: blending in equal parts, peanut oil, sunflower oil, and corn oil, heating the mixture for 2.30-3 hrs at 135° C. in a pre-heated oven, collecting the oil through mixing with acetone, cooling it down to room temperature, and then adding particulate soil in a ratio of 10:1 oil-particulate. ("Household Soil" with Carbon Black produced by Empirical Manufacturing company, Reinhold drive, Cincinnati, Ohio, United States). Enamel tiles are prepared by applying 0.08 g of the representative grease/particulate-artificial soil homogeneously and evenly through a manual soil sprayer and stored overnight in a constant temperature/humidity cabinet. The test composition is evaluated by applying the correct amount of the test composition directly to a sponge (Yellow cellulose sponge, "type Z", supplied by Boma, Nooderlaan 131, 2030 Antwerp, Belgium), and then cleaning the tile with the sponge using a forward-backward motion at 20 strokes per minute at a constant pressure of 1.4 $kN/m^2$. The percentage grease soil removal is evaluated by positioning a camera over the tile and using the camera to measure the percentage grease soil coverage of the tile after each cleaning stroke. The percentage grease soil removal after the specified number of strokes is then calculated as the fraction of soil removed after the specified number of strokes, expressed as a percentage. The number of strokes (forward and back) required to clean the tile till visually clean (i.e., the percentage grease soil remove is around 100%) is recorded as Strokes Number. The Cleaning Index is calculated as follows:

$$\frac{\text{Strokes Number for the reference}}{\text{Strokes Number for the test sample}} \times 100$$

A solution of APC (12 g/L) in industrial water alone or together with the Effervescent Perfume Particles are used as the test composition. Unexpectedly, the inventors found that the combination of APC and the Effervescent Perfume Particles showed a surprisingly synergistic effect for Cleaning Index, as shown in Table 3. More particularly, Bead 6 (1 g/L) alone does not show any significantly cleaning effect (Cleaning Index is around 22, that is the similar with Cleaning Index when using water only), but when combining with APC, Effervescent Perfume Particles results in a surprising improvement of Cleaning Index (156 vs. 100).

TABLE 3

| | APC | Bead 6 (1 g/L) | APC + Bead 6 (1 g/L) |
|---|---|---|---|
| Cleaning Index | 100 | 22 | 156 |

(2) Dose-Dependent Effect of the Effervescent Perfume Particles

A solution of APC (12 g/L) in industrial water alone or together with different dosage of the Effervescent Perfume Particles are used as the test composition. The results in Table 4 show that the Cleaning Index is enhanced when adding higher levels of beads e.g. 1 g/L to 2 g/L to 3 g/L.

TABLE 4

| | APC | APC + Bead 5 (1 g/L) | APC + Bead 5 (2 g/L) | APC + Bead 5 (3 g/L) |
|---|---|---|---|---|
| Cleaning Index | 100 | 148 | 209 | 276 |

(3) Cleaning Effect of the Effervescent Perfume Particles Alone

In order to evaluate whether the Effervescent Perfume Particles alone can deliver a cleaning benefit, different dosages of the Effervescent Perfume Particles alone (i.e., without any APC) were added into industrial water. The water with the addition of the Effervescent Perfume Particles were then tested in Cleaning performance tests as described above. As shown in Table 5, it is very surprising that, when used at the levels of 2 g/L and 3 g/L, the Effervescent Perfume Particles alone can deliver an outstanding Cleaning Index in view that Cleaning Index when using water only is around 20~25. Especially, at the level of 3 g/L, the Cleaning Index is even much better than APC (144 vs. 100 or 245 vs. 100).

TABLE 5

| | APC | Bead 10 alone (1 g/L) | Bead 10 alone (2 g/L) | Bead 10 alone (3 g/L) |
|---|---|---|---|---|
| Cleaning Index | 100 | 35 | 69 | 144 |
| | APC | Bead 15 alone (1 g/L) | Bead 15 alone (2 g/L) | Bead 15 alone (3 g/L) |
| Cleaning Index | 100 | 39 | 73 | 245 |

Example 4: Improved Shine Grade Achieved by the Effervescent Perfume Particles

Furthermore, the present inventors surprisingly discovered that the Effervescent Perfume Particles provide an extra benefit for shine performance. Streaks and/or films of residues (so called "shine") are sometimes formed on the treated hard surface by using hard surface cleaner. Particularly, the shine performance when using APC together with the Effervescent Perfume Particles is significantly improved in comparison with that when using APC alone.

A Shine Grade test is carried out for characterizing the shine performance. Particularly, a soil mixture comprising a mixture of consumer relevant soils such as oil, polymerized oil, particulates, pet hair, granulated sugar etc is used in this test. The black glossy ceramic tiles (Black Glossy Sphinx ceramic tiles 20×25 cm, Ref H07300, available at Carobati, Boomsesteenweg 36, 2630 Aartselaar www.carobati.be.) are soiled with the 0.03 g soil mixture (18.01 wt % Crisco oil [purchased from a North American supermarket], 2.08 wt % of polymerized Crisco oil [polymerized by pumping air at 1 PSI (0.0689 bar) through 500 g of Crisco oil in a 2 L beaker, while stirring at 125 rpm on a hot-plate set at 204° C. for 67 hours, before covering with an aluminum foil and leaving at 204° C. for an additional 30 hours, then cooling to room temperature with hot-plate turned off for 64 hours before heating at 204° C. for 64 hours, before cooling at room temperature with the hot-plate turned off for an additional 24 hours, so that the final viscosity of the oil is between 1800 and 2200 cps, when measured using a Brookfield DVT with spindle nr. 31 at 6 rpm], 28.87 wt % of granulated sugar, and 51.04 wt % of vacuum cleaner soil ["Vacuum Cleaner Soil" supplied by Chem-Pack, 2261 Spring Grove Avenue, Cincinnati Ohio 45214 USA]) by blending the soil mixture with isopropyl alcohol at 1.45 wt % and spraying onto the tile. The tiles are then cleaned with a solution of APC (12 g/L) in industrial water alone or together with the Effervescent Perfume Particles as prepared in Example 1. Subsequently, the tiles are kept till completely dry, and then evaluated by using the absolute Shine Grade (aSG) and the relative Shine Grade (rSG) scales as shown below. Particularly, a panel of three people grades each set of tiles, by using the scales below, in duplicate. Thus, 6 scores (3 graders×2 replicates) per product are obtained.

TABLE 6

| | aSG | rSG |
|---|---|---|
| Scale | 0 = as new/no streaks and/or film<br>1 = very slight streaks and/or film<br>2 = slight streaks and/or film<br>3 = slight to moderate streaks and/or film<br>4 = moderate streaks and/or film<br>5 = moderate/heavy streaks and/or film<br>6 = heavy streaks and/or film | 0 = No difference between test product and reference<br>1 = Maybe there is a difference between test product and reference, but I am not sure<br>2 = I am sure there is a difference between test product and reference, but it is small<br>3 = There is a significant difference between test product and reference<br>4 = There is a huge difference between test product and reference |
| Note | A lower grade indicates improved shine | + = test product better than reference<br>− = test product worse than reference |

Unexpectedly, the results indicate that the Effervescent Perfume Particles when used together with APC at certain levels (for example, 0.5 g/L and 1 g/L) significantly improve shine performance in comparison with APC alone, as shown in Table 7. More surprisingly, on the contrary, a further increased dosage of Effervescent Perfume Particles (for example, above 1.5 g/L) shows a negative impact on the shine performance. It implies a particular range of dosage is preferable, because it may bring about a perfect balance among Cleaning Index, Shine Grade and the cost.

TABLE 7A

| | APC | APC + Bead 4 (0.5 g/L) | APC + Bead 4 (1 g/L) | APC + Bead 4 (1.5 g/L) | APC + Bead 4 (2 g/L) | APC + Bead 4 (2.5 g/L) | APC + Bead 4 (3 g/L) |
|---|---|---|---|---|---|---|---|
| aSG | 4.00 | 2.17 | 3.00 | 5.00 | 4.67 | 4.67 | 5.00 |
| rSG | Ref. | 2.67 | 2.00 | −2.17 | −2.00 | −2.00 | −2.17 |

Further, Shine Grade test was carried out when the Effervescent Perfume Particles were used alone (i.e., the beads were added into industrial water without APC). The results indicate improvement over the use of an APC alone in the same water (see Table 7B below).

TABLE 7B

| | APC (in industrial water) | Bead 8-3 g/L (in industrial water) | Bead 9-3 g/L (in industrial water) | Industrial water alone |
|---|---|---|---|---|
| aSG | 4.00 | 3.75 | 3.50 | 4.00 |
| rSG | Ref. | 1.00 | 1.00 | −1.00 |

Example 5: Blooming Effect Achieved by the Effervescent Perfume Particles

Unexpectedly, the present inventors discovered that the Effervescent Perfume Particles provide a blooming effect for freshness in comparison with the Non-Effervescent Perfume Particles.

(1) Blooming Effect of the Effervescent Perfume Particles

Figure 3:
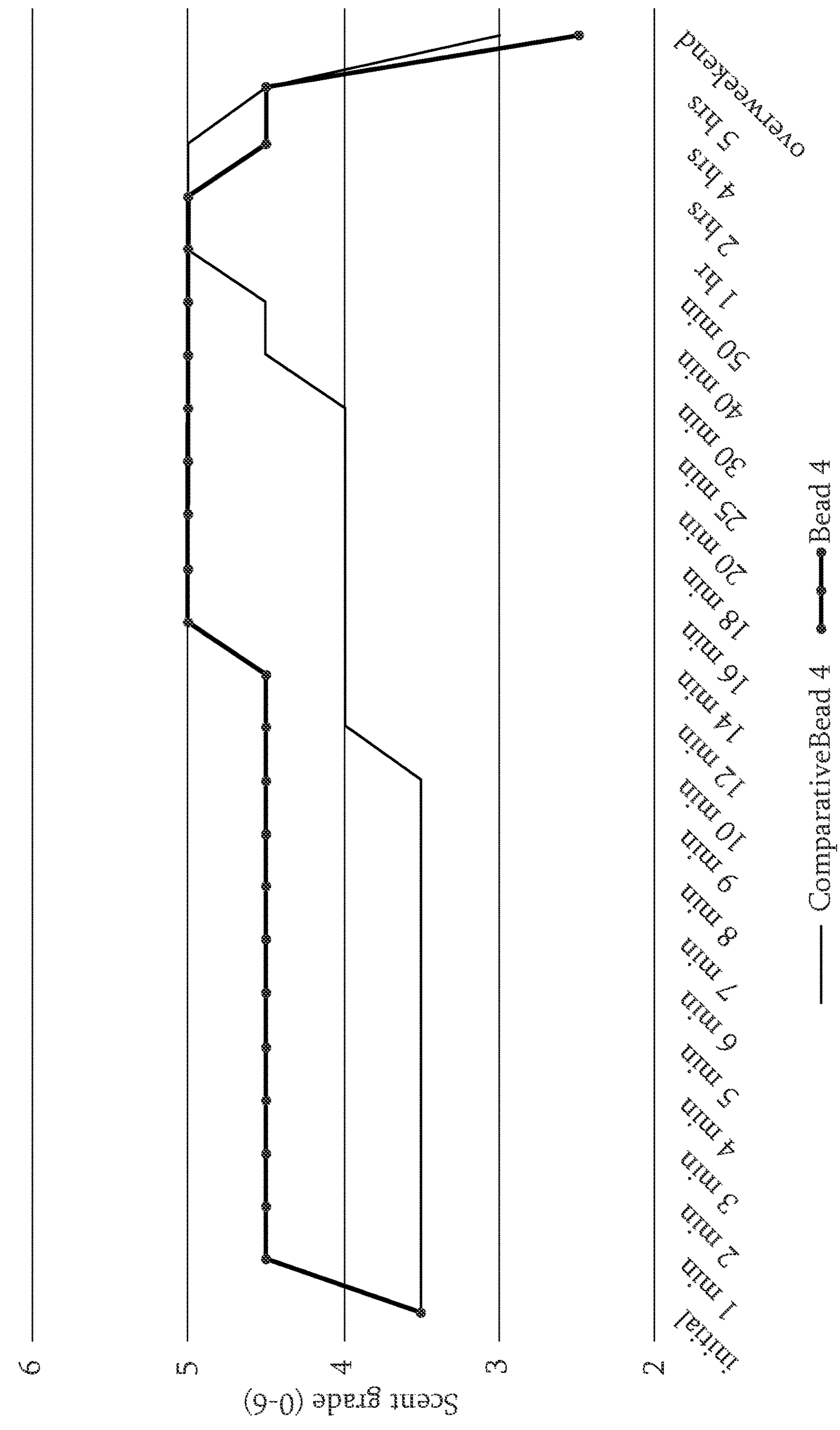
FIG. 3 show a blooming effect of Effervescent Perfume Particles, according to one embodiment of the present invention.

In this study, 1 g/L of the particles (Comparative Bead 4 and Bead 4 as prepared in Example 1, three samples for each) were added into a bucket containing a solution of APC (12 g/L) in industrial water at 20° C. Then, the buckets containing APC and the particles were placed among a trained panelist (i.e., the perfume professional), who smelled the perfume scent at randomized sequences to give objective quantitative assessment. Evaluations are done in odor cabinets. The panelist scored the perfume scent on a 0 to 6 scale (0=no scent and 6=extremely strong odor). Perfume scent scores were determined for both particles comprising the effervescent system and particles without the effervescent system. FIG. 3 shows that the Effervescent Perfume Particles exhibit an unexpected blooming effect, in comparison with the Non-Effervescent Perfume Particles. Particularly, the Effervescent Perfume Particles achieve the peak or nearly peak freshness at the very beginning, while the perfume scent released by the Non-Effervescent Perfume Particles gradually increases and achieves the peak after one hour since the addition of the particles.

(2) Dose-Dependent Effect of the Effervescent Perfume Particles

The inventors have further discovered that the higher dosage of beads (1 g/L, vs 2 g/L vs 3 g/L vs APC without beads) is positively impacting the blooming and longevity profile on tiles in odour cabinets. In this study, various dosages of beads (three samples for each dosage) were blinded and added into a solution of APC (12 g/L) in industrial water at 20° C. Then, a sponge is immersed into the APC solution alone or containing various dosages of beads. Such sponge is then employed to wipe a tile. The trained panelist smelled the perfume scent on the tile at randomized sequences to give objective quantitative assessment. Evaluations are done in odor cabinets. The panelists scored the perfume scent on a 0 to 6 scale (0=no scent and 6=extremely strong odor), as shown in the following table.

TABLE 8

| Perfume scent grade | Initial wet | Initial dry | 30 min | 1 hr | 2 hrs | 5 hrs | overnight |
|---|---|---|---|---|---|---|---|
| APC | 0.5 | 1 | 2 | 2 | 2 | 2 | 1 |
| APC + Bead 5 (1 g/L) | 1.5 | 3 | 3.5 | 4 | 4 | 4 | 3 |
| APC + Bead 5 (2 g/L) | 2 | 4 | 4.5 | 5 | 5 | 5 | 4 |
| APC + Bead 5 (3 g/L) | 2.5 | 4 | 5 | 5 | 5 | 5.5 | 4 |

Example 6: Improved Longevity Achieved by the Effervescent Perfume Particles

Unexpectedly, the present inventors discovered that the Effervescent Perfume Particles provide an improved longevity for freshness in comparison with the APC alone.

In this study, 1 g/L of the particles (Bead 5 as prepared in Example 1, three samples for each) were added into a bucket containing industrial water at 20° C. without APC. Another bucket containing APC (12 g/L) in industrial water was prepared as well. Then, similarly as in Example 3, a sponge is immersed into the water containing Bead 5 or APC solution. Such sponge is then employed to wipe a tile. The trained panelist smelled the perfume scent on the tile at randomized sequences to give objective quantitative assessment. Evaluations are done in odour cabinets. The panelists scored the perfume scent on a 0 to 6 scale (0=no scent and 6=extremely strong odour), as shown in the following table.

The results indicate that adding the beads direct to the water without the APC produced an improved longevity profile compared to the APC alone.

TABLE 9

| Perfume scent grade | Initial wet | Initial dry | 30 min | 1 hr | 2 hrs | 5 hrs | overnight |
|---|---|---|---|---|---|---|---|
| APC | 0.5 | 1 | 2 | 2 | 2 | 2 | 1 |
| Bead 5 (1 g/L) | 1.0 | 3 | N/M | 5 | N/M | 5 | 5 |

Example 7: Exemplary Effervescent Perfume Particles

The following are examples of Effervescent Perfume Particles comprising PEG, effervescent system and perfume (see the following table). The Beads A to M are prepared similarly as in Example 1.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entity unless explicitly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

TABLE 10

| Ingredients (parts by weight) | Bead A | Bead B | Bead C | Bead D | Bead E | Bead F | Bead G | Bead H | Bead I |
|---|---|---|---|---|---|---|---|---|---|
| PEG 8000[1] | 43.995 | — | — | 48.22 | 48.50 | 48.39 | — | 45.00 | 50.00 |
| PE 12000 | — | 37.5 | 55.00 | — | — | — | 30.80 | — | — |
| Tartaric acid | 25.52 | 21.75 | 13.88 | 26.89 | 21.75 | 13.05 | 34.80 | — | — |
| Citric acid | — | — | — | — | — | — | — | 14.19 | 16.34 |
| Sodium carbonate | 16.72 | 14.25 | 13.88 | 17.62 | 14.25 | 18.00 | 22.80 | — | — |
| Sodium bicarbonate | — | — | — | — | — | — | — | 18.81 | 21.66 |
| Neat Perfume | 12.00 | 25 | 13.00 | 7.27 | 12.00 | 1.20 | 10.00 | 19.00 | 9.00 |
| Perfume Microcapsule | — | — | 2.00 | — | — | — | — | — | — |
| Surfactant A[2] | — | — | — | — | 2.00 | — | — | — | — |
| Surfactant B[3] | — | — | — | — | — | 17.75 | — | — | — |
| Binder A[4] | 1.76 | 1.5 | 2.24 | — | 1.5 | 1.60 | — | 2 | — |
| Binder B[5] | — | — | — | — | — | — | 1.6 | — | — |
| Binder C[6] | — | — | — | — | — | — | — | — | 2 |
| Lubricant[7] | — | — | — | — | — | — | — | 1 | 1 |
| Dye | 0.005 | — | — | — | — | 0.01 | — | — | — |
| Total parts | 100 | 100 | 100 | 100 | 100 | 100 | 100 | 100 | 100 |
| % Air by Volume of Particle | — | 20 | — | — | — | — | — | — | — |

Table 10 (continued)

| Ingredients (parts by weight) | Bead J | Bead K | Bead L | Bead M |
|---|---|---|---|---|
| PEG 8000[1] | 63.50 | 51.00 | — | — |
| PE 12000 | — | — | 37.5 | 55.00 |
| Tartaric acid | — | — | 21.75 | 13.88 |
| Citric acid | 7.10 | 8.17 | — | — |
| Sodium carbonate | — | — | 14.25 | 13.88 |
| Sodium bicarbonate | 9.40 | 10.83 | — | — |
| Starch Encapsuled Perfume | 20.00 | 30.00 | 25 | 13.00 |
| Neat Perfume | — | — | 1.5 | 4.24 |
| Total parts | 100 | 100 | 100 | 100 |

[1]PEG 8000 and 12000 from Alfa Aesar

[2]Neodol C9-11E08 from Sasol

[3]Bardac 2280 from Lonza

[4]Emocel ® 50M, microcrystalline cellulose (MCC) available from JRS Pharma

[5]Vivapur 101 from JRS Pharma

[6]Flowlac 90 Lactose available from Meggle

[7]PEG 4000 from Alfar Aesar

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A composition comprising a plurality of particles, said particles comprising:

from 45% to 80% of polyalkylene glycol having a weight average molecular weight from 7000 to 40000 by total weight of said particles;

from 0.01% to 40%, of a co-carrier by total weight of said particles, wherein said co-carrier is selected from the group of block copolymers of polyethylene oxide/polypropylene oxide, polyethylene glycol fatty alcohol ether, and combinations thereof;

a powder comprising an effervescent system, the effervescent system comprising an acid source and an alkali source selected from the group of a carbonate salt, a bicarbonate salt, a sesquicarbonate salt, and combinations thereof; and from 0.1% to 50% of perfume by total weight of said particles, wherein the composition does not include glycerol and occlusions of gas.

2. The composition according to claim 1, wherein said acid source is selected from the group of citric acid, malic acid, tartaric acid, fumaric acid, adipic acid, maleic acid, aspartic acid, glutaric acid, malonic acid, succinic acid, boric acid, benzoic acid, oleic acid, citramalic acid, 3-chetoglutaric acid, and combinations thereof.

3. The composition according to claim 2, wherein the molar ratio of acidic functional groups of said acid source to basic functional groups of said alkali source is from 10:1 to 1:10.

4. The composition according to claim 1, wherein said particles further comprise from 0.01% to 20% of a surfactant by total weight of said particles, wherein said surfactant is selected from the group of alkyl sulphates, alkyl benzene sulphonate, alkyl ethoxylates, and combinations thereof.

5. The composition according to claim 1, wherein said particles further comprise from 0.01% to 50% of a binder by total weight of said particles, wherein said binder is selected from the group of lactose, dextrose, sucrose, maltodextrin or hydrogenated dextrin, cellulose or modified cellulose, sugar alcohols, gelatin or derivatives thereof, polyvinyl alcohols, polyvinylpyrrolidone, copolymers of polyvinyl alcohols/polyvinylpyrrolidone, and combinations thereof.

6. The composition according to claim 1, wherein said particles further comprise from 0.01% to 20% of a lubricant by total weight of said particles, wherein said lubricant is selected from the group of stearates; benzoate; talc; behenates; sodium acetate; silica; polyethylene glycol having a weight average molecular weight from 1000 to 6000; and combinations thereof.

7. The composition according to claim 1, wherein said perfume is free perfume, encapsulated perfume, or a combination of free perfume and encapsulated perfume.

8. The composition according to claim 1, wherein said particles comprise from 3% to 40% of said perfume by total weight of said particles.

9. The composition according to claim 1, wherein each of said particles has a volume of from 0.002 $cm^3$ to 1 $cm^3$; and/or wherein each of said particles has a mass from 0.95 mg to 2 g.

10. The composition according to claim 1, wherein: said particles are in a shape selected from the group of tablets, spherical, hemispherical, compressed hemispherical, lentil shaped, oblong, cylinder, and rod; and wherein said particles have a distribution of heights, wherein said distribution of heights has a mean height between 1 mm and 8 mm, and a standard deviation of from 0.05 to 0.6.

11. The composition according to claim 1, wherein said polyalkylene glycol is polyethylene glycol having a weight average molecular weight from 3000 to 30000.

12. A method of making the composition comprising a plurality of particles according to claim 1; wherein said method comprises the steps of:

1) providing a viscous material comprising: said polyalkylene glycol, said co-carrier, said powder comprising the effervescent system and said perfume; and 2) passing said viscous material through one or more apertures onto a surface upon which said viscous material is cooled to form a plurality of particles.

13. The method according to claim 12, wherein said viscous material further comprises:

(e) from 1% to 5% of a surfactant by total weight of said viscous material; and/or (f) from 1% to 10% of a binder by total weight of said viscous material; and/or (g) from 1% to 5% of a lubricant by total weight of said viscous material.

14. A method of making the composition comprising a plurality of particles according to claim 1; wherein said method comprises the steps of:

1) providing a slurry comprising: said polyalkylene glycol, wherein said polyethylene glycol is molten, and said perfume;

2) atomizing said slurry through an atomizer into a chamber maintained at a temperature below the melting point of said polyalkylene glycol resulting in the formation of microparticles containing said polyalkylene glycol and said perfume;

3) mixing said microparticles with a said powder comprising said effervescent system and said co-carrier to form a mixed powder in which the weight ratio of said microparticles to said powder is from 5:1 to 1:5; and 4) compressing said mixed powder into particles.

15. The method according to claim 14, wherein said powder further comprises one or more ingredients selected from the group of a binder, a surfactant, and a lubricant.

16. A method of cleaning a hard surface by using the composition according to claim 1 comprising the steps of:

a) diluting the composition to a dilution level of from 0.05% to 5% by volume, and b) applying the diluted composition to the hard surface.

17. A composition comprising a plurality of particles, said particles comprising:

from 45% to 80% of polyalkylene glycol having a weight average molecular weight from 7000 to 40000 by total weight of said particles;

from 0.01% to 40%, of a co-carrier by total weight of said particles, wherein said co-carrier is selected from the group of block copolymers of polyethylene oxide/polypropylene oxide, polyethylene glycol fatty alcohol ether, and combinations thereof;

an alkali source selected from the group of a carbonate salt, a bicarbonate salt, a sesquicarbonate salt, and combinations thereof; and from 0.1% to 50% of perfume by total weight of said particles;

wherein said particles have a flat base and an opposing curved surface, wherein the composition does not include glycerol and occlusions of gas.

18. The composition according to claim 17, wherein said particles comprises an acid source selected from the group of citric acid, malic acid, tartaric acid, fumaric acid, adipic acid, maleic acid, aspartic acid, glutaric acid, malonic acid, succinic acid, boric acid, benzoic acid, oleic acid, citramalic acid, 3-chetoglutaric acid, and combinations thereof.

19. The composition according to claim 17, wherein said particles further comprise from 0.01% to 20% of a surfactant by total weight of said particles, wherein said surfactant is selected from the group of alkyl sulphates, alkyl benzene sulphonate, alkyl ethoxylates, and combinations thereof.

20. The composition according to claim 17, wherein said particles further comprise from 0.01% to 50% of a binder by total weight of said particles, wherein said binder is selected from the group of lactose, dextrose, sucrose, maltodextrin or hydrogenated dextrin, cellulose or modified cellulose, sugar alcohols, gelatin or derivatives thereof, polyvinyl alcohols, polyvinylpyrrolidone, copolymers of polyvinyl alcohols/polyvinylpyrrolidone, and combinations thereof.

21. The composition according to claim 17, wherein said particles further comprise from 0.01% to 20% of a lubricant by total weight of said particles, wherein said lubricant is selected from the group of stearates; benzoate; talc; behenates; sodium acetate; silica; polyethylene glycol having a weight average molecular weight from 1000 to 6000; and combinations thereof.

* * * * *